United States Patent [19]

Tsutsui et al.

[11] 4,378,597
[45] Mar. 29, 1983

[54] RECORD CLEANING DEVICE

[75] Inventors: Tatsuhiko Tsutsui, Funabashi; Toru Sema, Yokohama; Tsuneo Umezawa, Narashino, all of Japan

[73] Assignee: Lion Corporation, Tokyo, Japan

[21] Appl. No.: 206,108

[22] Filed: Nov. 12, 1980

[30] Foreign Application Priority Data

Dec. 17, 1979 [JP] Japan .............................. 54-175113[U]
Dec. 17, 1979 [JP] Japan .............................. 54-175114[U]
Dec. 17, 1979 [JP] Japan .............................. 54-175115[U]

[51] Int. Cl.³ ............................................. G11B 3/58
[52] U.S. Cl. ............................................ 369/72; 15/1
[58] Field of Search ................... 15/1, 104 R, 104 A, 15/DIG. 14; 134/4; 118/409, 415; 369/72

[56] References Cited

U.S. PATENT DOCUMENTS

| | | | |
|---|---|---|---|
| 1,261,688 | 4/1918 | Bratherton | 369/72 |
| 2,646,771 | 7/1953 | Salditt | 118/415 |
| 3,099,371 | 7/1963 | Meader | 118/415 |
| 3,295,495 | 1/1967 | Ellis | 118/409 |
| 3,355,177 | 11/1967 | King | 369/72 |
| 4,199,375 | 4/1980 | Muller | 15/DIG. 14 |

Primary Examiner—John W. Shepperd
Attorney, Agent, or Firm—Jordan and Hamburg

[57] ABSTRACT

A record cleaning device comprises a container body for receiving therein an adhesive material to be applied onto a surface of a record for cleaning, a slit formed in the bottom of the container body, an arm member attached to an end of the container body to be integrally formed therewith, and positioning means provided at an end of the arm member. The positioning means is located in the center of the record to be cleaned so that the container body can be rotated over the record. The cleaning device is further provided with support means situated on at least one of the bottom face of the container body and the bottom face of the arm member to form a clearance between the bottom of the slit and an upper surface of the record to be cleaned when the cleaning device is located on the record. Consequently, when the container body is turned over the record, the adhesive material can be applied uniformly onto the upper surface of the record through the slit and the clearance.

17 Claims, 20 Drawing Figures

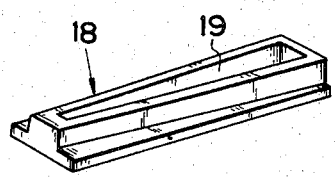
FIG. 12
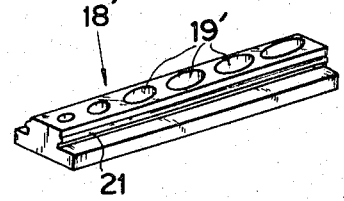
FIG. 13
FIG. 11
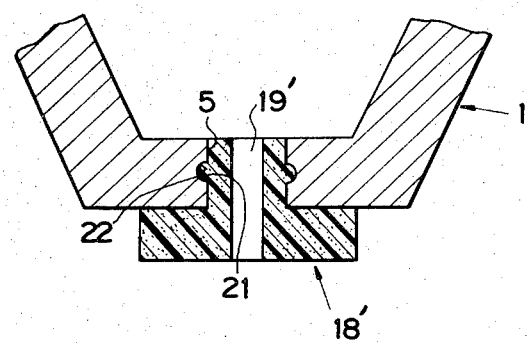
FIG. 14
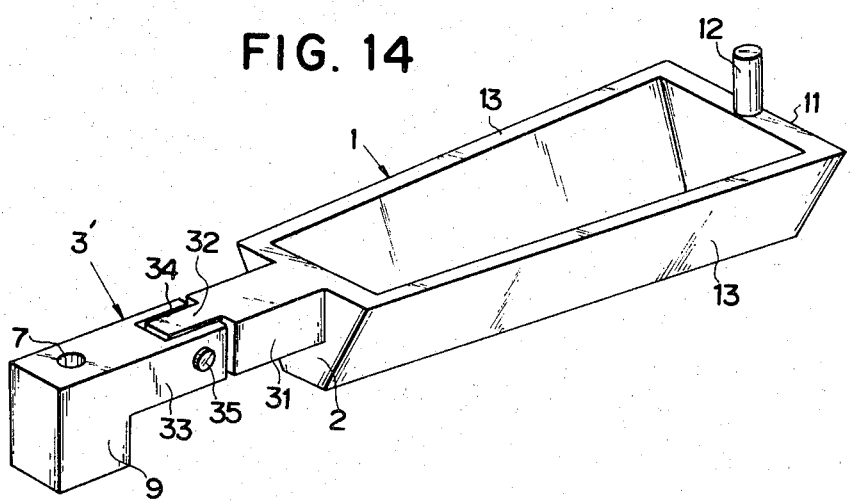

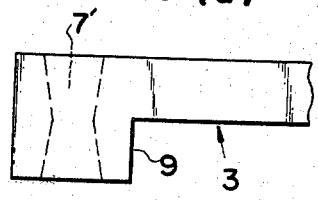
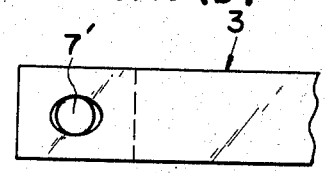
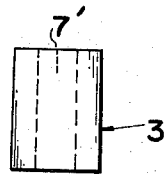
FIG. 16
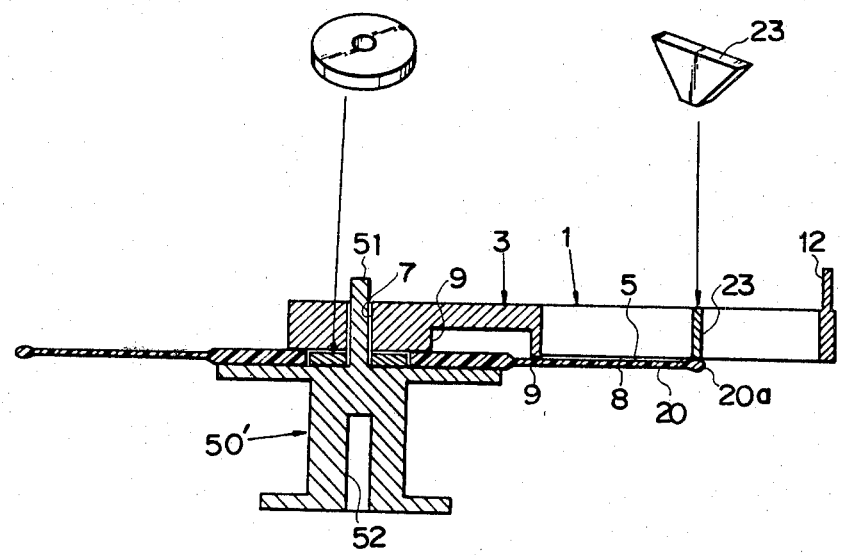

RECORD CLEANING DEVICE

REFERENCE TO PATENT, APPLICATIONS AND PUBLICATIONS PERTINENT TO THE INVENTION

A document pertinent to the present invention is U.S. Pat. No. 3,958,292.

BACKGROUND OF THE INVENTION

The present invention relates to a record cleaning device for use in applying to the surface of a phonograph record or video disc an adhesive which is tacky and can be peeled or separated, after dried, as a film from the record face.

Conventional methods of cleaning phonograph records have been proposed, including wiping the surface of a record after spraying a cleaning liquid over the record surface, and use of a roller, as disclosed in the U.S. Pat. No. 3,958,292, provided with an adhesive tape on the surface thereof and which is to be rolled in contact over the record surface, thus removing dirt and dust as caught by the adhesive tape. These conventional cleaning methods permit to remove dirt and dust on the surface of the record, but not dust particles in the sound grooves in the record face.

To eliminate such drawbacks, a method of removing dirt and dust on the record surface as well as in the sound grooves in the record face has been proposed. According to this method, an adhesive is composed of polyvinyl alcohol as film forming material, mixture of water and alcohol as solvent, polyether silicon as peeling material, polyoxyethylene alkyl amine as anti-static agent, and a little amount of plasticizer, and it is applied to the surface of the phonograph record. The adhesive applied to the record surface is left for a predetermined length of time until it dries. The resultant film of the adhesive thus contains the dirt and dust on the record surface as well as in the sound grooves in the record face. The film is then peeled off the record surface; in this way, the record is cleaned. The use of such adhesive is very effective for removal of dirt and dust on the record surface, but no means has been proposed which can effectively apply the adhesive to the record surface. A record cleaning device of the prior art, which has been proposed as a helpful applicator, is composed of a flexible, cylindrical container provided at the open end thereof with a sponge; the adhesive is put into the container. By compressing the container body by hand with the sponge being on the lower side, the adhesive penetrates into the sponge. By rubbing the record surface with the sponge, the adhesive is applied to the record surface. However, such conventional record cleaning device can hardly apply the adhesive uniformly over the record surface; it takes a long time to provide a uniform thickness of adhesive layer on the record surface. In addition, such uniform application of the adhesive requires a skill. If the adhesive is applied unevenly to the record surface, adhesive layers of excessive thickness are often made; thus the drying time is longer because it is necessary to wait until the thickest layer of adhesive dries up. In some cases, it took more than one day to clean the surface of a record. On the contrary, when it is intended to apply the adhesive to a thin layer on the record surface, there remain some regions with no application of the adhesive or extremely thin layers of the adhesive are produced in many cases. Although the drying time is shorter when the film of adhesive is thinner, the film is easy to break at the no-adhesive regions or thin layers; in this case, it takes much labor and time to clear such film pieces. Besides, if a film easy to break is formed on the record surface, it is rather difficult to peel it off and to clear it. Eventually the film pieces remain in the sound grooves in the record face. It is difficult to remove the film pieces remaining in the sound grooves, if the record in question is played, the film pieces remained in the sound grooves will damage the stylus or spoil the record playing.

BRIEF SUMMARY OF THE INVENTION

The object of the present invention is to provide a record cleaning device which as a whole can be simply pivotted over a phonograph record or video disc to apply uniformly to the surface of the record or disc an adhesive which is tacky and can be peeled, after dried, as a film off the record surface.

BRIEF DESCRIPTION OF THE DRAWINGS

The accompanying drawings illustrate the preferred embodiments of record cleaning device according to the present invention; in which:

FIGS. 10 and 11 are section views, respectively, showing an applicator member fitted in the slit formed in the container bottom;

FIG. 12 shows perspectively the applicator member used as shown in FIG. 10;

FIG. 13 is a perspective view of the applicator member used as shown in FIG. 11;

FIG. 14 is also a perspective view of a record cleaning device according to the present invention, in which the arm member is vertically movable;

FIGS. 15 (a) thru (c) are front, plan and left side views, respectively, of a variation of the arm member;

FIG. 16 is a sectional view of the container body, showing the container body inside used as divided with a partition piece;

DETAILED DESCRIPTION OF THE INVENTION

Figure 1:
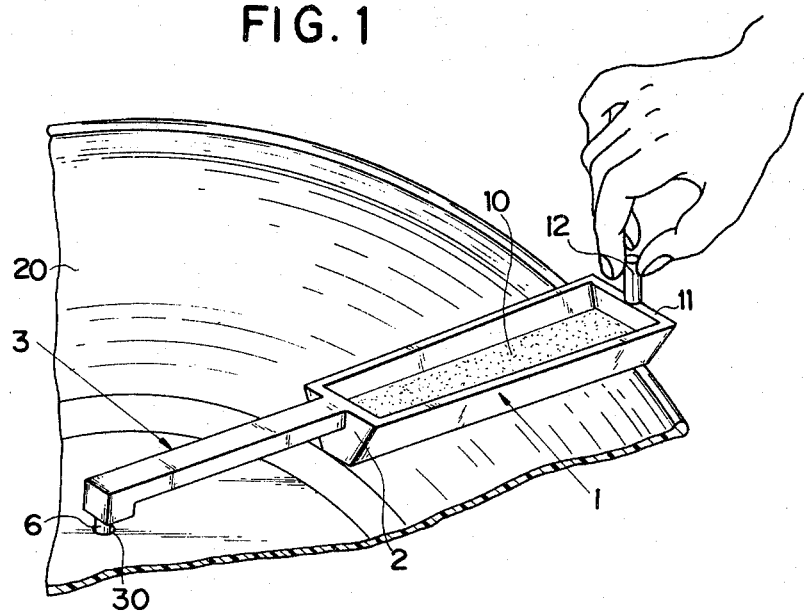
FIG. 1 is a perspective view of the record cleaning device according to the present invention, the device being in position for cleaning use.
Figure 2:
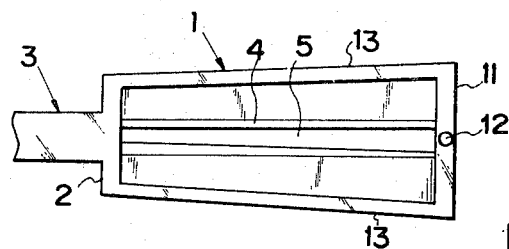
FIG. 2 is a plan view showing one example of container body for use in the cleaning device of FIG. 1.
Figure 3:
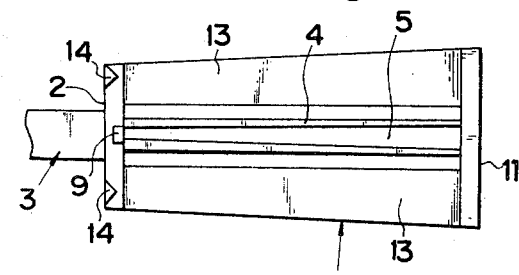
FIG. 3 is a bottom view of the container body shown in FIG. 2.

Referring now to FIG. 1, the record cleaning device according to the present invention is shown in position for cleaning use; as seen in this Figure, the device is composed of a container body 1 for the adhesive 10, an arm member 3 formed integrally with one end 2 of the container 1, a stud 6 provided on the bottom face at the free end of the arm member 3, and a handle 12 provided on the top face at the outer end 11 of the container body 1. In one example structure of the container 1 shown in FIG. 1, a slit 5 is formed in a bottom 4 of the container 1 as shown in FIGS. 2 and 3. The adhesive 10 in the container 1 flows out through the slit 5. This slit 5 is divergent toward the outer end 11 of the container 1. Because of this slit's shape, the discharge rate of the adhesive 10 through the slit 5 varies in various longitudinal positions. More particularly, as the outer end 11 of the container 1 is approached, the adhesive 10 is discharged at a higher rate. The width of the slit 5 should preferably be a minimum of 1 mm or so and a maximum of 6 mm or so. Corresponding to the above-mentioned shape of slit 5, the inner faces 13 of the container 1 are more away from each other as the outer end 11 is approached, namely, the amount of the adhesive in the container is greater as the end 11 is approached. Further, the inner faces 13 of the container are so inclined that the space defined by both the faces 13 is convergent toward the container bottom 4, thus facilitating the discharge of the adhesive 10 through the slit 5. The container body 1 has provided at the bottom face thereof a support member 9, as shown in FIG. 3, which keeps the bottom of the slit 5 a little distance from the surface of a phonograph record 20 to provide a clearance 8 between the slit bottom and record surface. Although this support member 9 is constituted by a protrusion formed on the bottom face of the inner end 2 of the container 1 as shown in FIG. 3, the support member 9 may be provided on the bottom face of the arm member 3. As shown in the sectional view in FIG. 4, when the cleaning device according to the present invention is set over the surface of the record 20, the support member 9 provides the clearance 8 between the bottom of the slit 5 and the surface of the record 20. This clearance 8 is usually about 0.4 mm. It is to be borne in mind that the bottom face of the outer end 11 of the container 1 is mounted on a rib 20a existing along the outer circumference of the record 20. Accordingly, the bottom of the slit 5 is kept away from the record surface 20 by both the rib 20a and the support member 9. Further, another support member 9 may be formed on the bottom face at the outer end 11 of the container 1; thus, the bottom of the slit 5 is raised 0.4 mm or so above the surface of the record 20 by means of these two protrusion-like support member 9 (one is already provided on the bottom face at the inner end 2 of the container 1 as described in the above).

In addition, there may be provided on the bottom face at the inner end 2 of the container body 1 scraping protrusions 14, as shown in FIG. 3, serving to prevent an adhesive 10 in use which is low in viscosity and consequently has a high fluidity, from flowing toward the pivot or center of the record 20 after discharged through the slit 5, and to return it to within the sound groove region. Otherwise, the scraping protrusions 14 may be formed integrally with the support member 9, namely, a protruding stripe may be formed on the bottom face at the inner end 2 of the container along the nearly total width of the inner end 2 so that the stripe functions as both the support member 9 and scraping protrusions 14.

Figure 4:
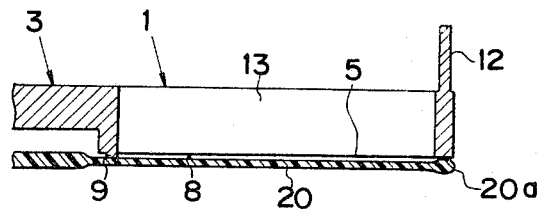
FIG. 4 is a sectional view of the container body in FIGS. 2 and 3, the container being mounted over the record surface.

Here, the application of the adhesive 10 to the surface of the record 20 using the record cleaning device according to the present invention comprising the container 1 constructed as shown in FIGS. 2 thru 4 will be described with reference to FIG. 1. First, the stud 6 provided on the bottom face at the free end of the arm member 3 is inserted into the center hole 30 in the record 20, thus positioning the cleaning device according to the invention radially on the surface of the record 20. At this time, the support member 9 shaped on the bottom face at the inner end 2 of the container body 1 is put into contact with the record surface near the sound groove zone of the record 20 while the bottom face at the outer end 11 of the container 1 is in contact with the rib 20a of the record 20. This is shown in FIG. 4. Thereafter, the adhesive 10 in a predetermined amount is put into the container 1. Then, the entire device is gently and slowly pivotted over the surface of the record 20 in either clockwise or counterclockwise direction by holding the handle 12 by fingers. As the device is turned over the surface of the record 20, the adhesive 10 is discharged through the slit 5 to the surface of the record 20. With a full turn of the device, the surface of the record 20 will be found uniformly applied with the adhesive 10.

The portion near the outer end 11 of the container is higher in pivotal speed than that near the inner end 2; accordingly, if the discharge rate of the adhesive 10 flowing out through the slit 5 is fixed along the entire length of the slit 5, the layer thickness of the adhesive 10 applied to the surface of the record 20 is greater as the center hole 30 in the record 20 is approached, while it is smaller as the outer end 11 of the container 1 is approached. To avoid this, the device according to the present invention is so constructed that the volume of the adhesive 10 in the container 1 is greater as the outer end 11 is approached, and the slit 5 is divergent toward the outer end 11. Owing to this design, the discharge rate of the adhesive 10 through the slit 5 during the turn of the present device is almost the same along the entire length of the slit 5, and upon completion of a full turn of the device, the adhesive 10 is found evenly consumed along the length of the container 1 with no greater remainder or shortage of the adhesive 10 at certain portions within the container 1. Thus, the adhesive 10 is uniformly applied to the surface of the record 20.

Figure 5:
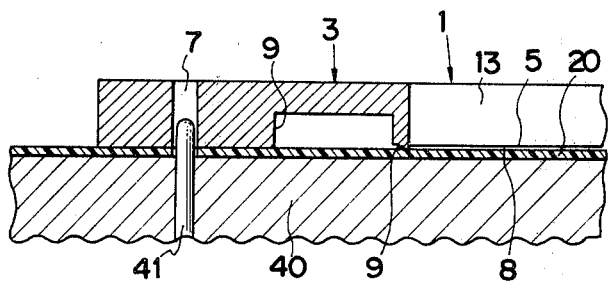
FIG. 5 is a sectional view of the cleaning device having a hole provided in the arm member thereof according to the present invention, the device being mounted over the record placed on the turntable of a record player.
Figure 6:
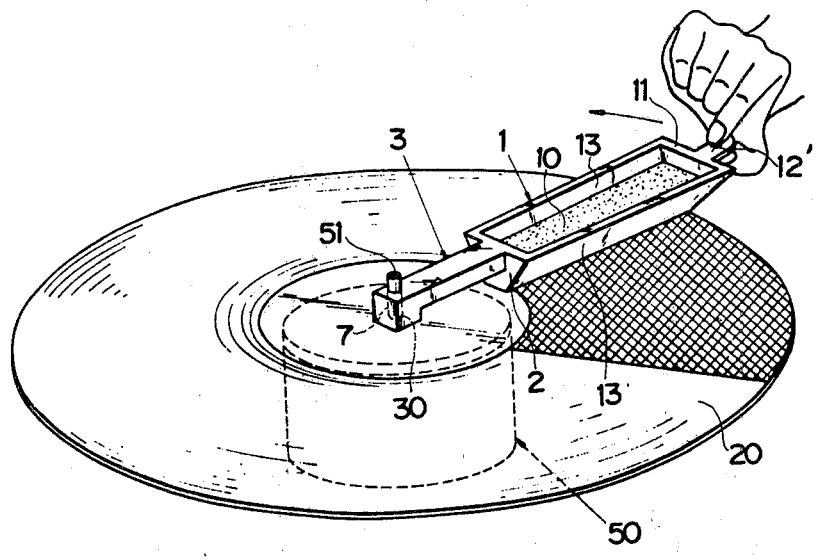
FIG. 6 is a perspective view of the cleaning device in FIG. 5, the device being shown in position for use as mounted over the record placed on a record support which is for use in combination with the cleaning device according to the present invention.

FIG. 5 shows a record cleaning device according to the present invention, in which a hole 7 is formed in place of the above-mentioned stud 6 in the bottom face at the free end of the arm member 3 and the bottom of the free end of the arm member 3 is extended downward, this extension serving as the support member 9. In case of this record cleaning device equipped with the hole 7 and support member 9 on the bottom of the arm member 3, it is set over the record 10 by fitting the hole 7 onto a shaft 41 or stud 51 projecting from a center hole 30 in the record 20 placed on a turntable 40 of a record player as shown in FIG. 5, or a record support 50 for use in combination with the cleaning device according to the present invention. The structure of the container 1 shown in FIGS. 5 and 6 is similar to that of the container 1 shown in FIGS. 1 thru 4, except that the container 1 in FIG. 6 is provided with a handle 12' on the top at the outer end 11 thereof. The record support 50 shown in FIG. 6 has so dimensioned and shaped that the top face thereof is in contact with only the central area (on which a record label is usually attached) defined by the sound groove zone of the record 20, without contact with the sound groove zone. A stud 51 is projected from the top face of the support 50. Since the top face of the support 50 is in contact with only the label area of the record 20, after the adhesive 10 is applied to the one side of the record 20 and even when the adhesive 10 is not yet dried sufficiently, the record 20 can be turned over and placed on the support 50 for application of the adhesive 10 to the other side of the record 20; in other words, even if the record 20 applied with the adhesive 10 on one face thereof is placed on the record support 50 with the face being on lower side, the top face of the support 50 will not be in contact with the adhesive 10 applied to the sound groove zone of the record 20.

Figure 7:
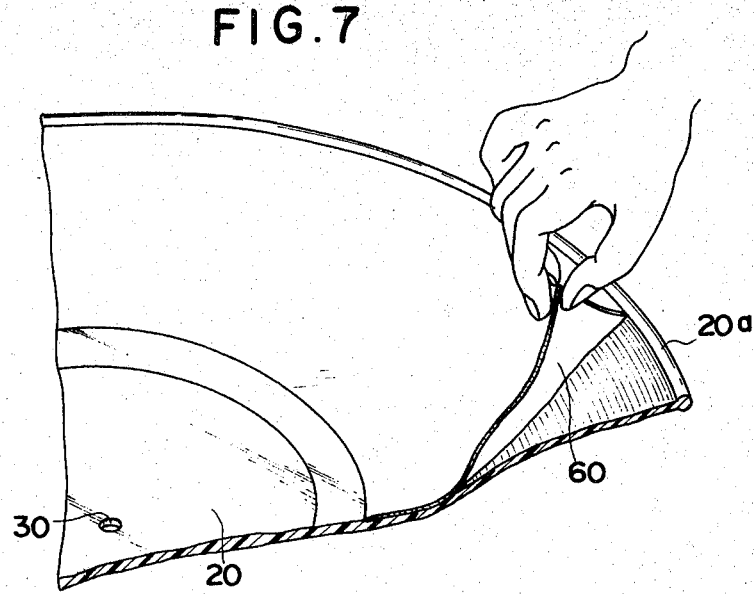
FIG. 7 is a perspective view of a film resulted from the adhesive dried after application, the film being peeled off the record surface.

The adhesive 10 applied to the record 20 becomes a film 60 after dried. This film 60 can be easily peeled off the surface of the record 20 as shown in FIG. 7. The film 60 contains the dirt and dust on the record surface as well as those in the sound grooves of the record 20. Thus, by peeling off the film 60, the dirt and dust on the record 20 can be removed. The adhesive 10 per se is not novel, and is composed of a polyvinyl alcohol or vinyl acetate as film forming material in about 15%, polyether silicon as peeling agent in about 0.6%, polyoxyethylene alkyl amine as anti-static agent in about 0.2%, polyethylene glycol or dioctyl ester phthalate as plasticizer in 0.2% and a mixture liquid of water and alcohol as solvent in 85%. This adhesive has viscosity of 14 poises and easily available.

Figure 8:
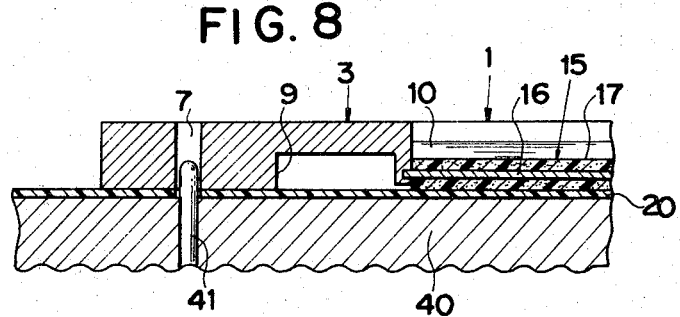
FIGS. 8 and 9 are cross-sections of the container body, illustrating a roller provided in the slit formed in the container bottom.
Figure 9:
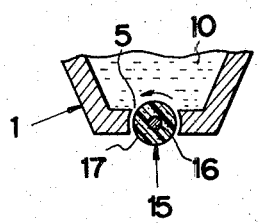

FIG. 8 shows a record cleaning device according to the present invention, in which a roller 15 is rotatably installed in the slit 5 formed in the bottom 4 of the container 1. This roller 15 is composed of a central shaft 16 around which a soft and flexible cylinder 17 made of sponge or soft synthetic rubber is installed. The cylinder 17 is so installed to the central shaft 12 as to provide a small clearance between the slit faces 5 and the roller body as shown in FIG. 9. Further, the cylinder 17 is projected a little downward from the bottom of the slit 5 so that the roller 15 itself serves as the above-mentioned support member 9. Such record cleaning device in which the roller 15 is installed in the slit 5 can be effectively used with an adhesive 10 which represents a high viscosity and flows through the slit 5 extremely slowly. In this case, the rotation of the roller 15 forces the adhesive 10 to flow out through the slit 5, thus permitting a smooth and speedy application of the adhesive 10. Since the cylinder 17 is made of a soft and flexible material, it can constantly maintain a contact with the surface of the record 20 even if the record surface is irregular due to any warpage or deformation of the record 20, namely, the adhesive 10 can be applied uniformly to the record surface. Further, the cleaning device can be so designed in the respect of the clearance between the cylinder 17 and the slit 5 that an adhesive 10 of an extremely high viscosity will not flow out through the clearance when the roller 15 is stationary and that the flow out of the adhesive through the clearance is permitted only by the rotation of the roller 15; thus, the roller 15 can serve to close and open the slit 5.

Figure 10:
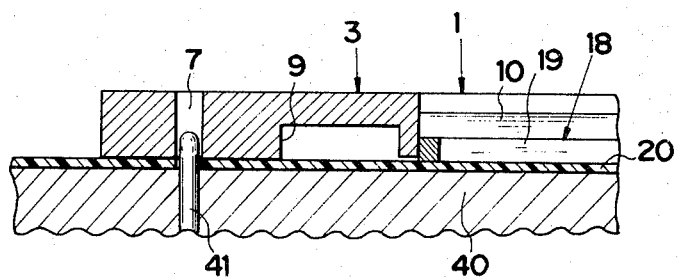

FIG. 10 shows a record cleaning device in which an applicator member 18 is installed in the slit 5 in place of the roller 15 in FIGS. 8 and 9. This applicator member 18 has provided therein a continuous elongated hole 19 as shown in FIG. 12. The applicator member 18 is installed to the slit 5 by forcibly fitting it into the slit 5. As shown in FIG. 13, an applicator member 18' is provided with a plurality of openings 19'. The applicator member 18' is installed in the slit 5 so that raised stripes 21 formed on opposite sides of the applicator member 18', is engaged with concave stripes 22 formed in the opposite inner faces of the slit 5 as shown in FIG. 11. Thus, the applicator members 18', 18 are removably installed to the slit 5. Similar to the above-described soft and flexible cylinder 17 of the roller 15, the applicator members 18, 18' are made of a soft and flexible material. The adhesive 10 is applied through the opening 19 in the applicator member 18 to the surface of the record 20. Since the applicator member 18 is moved always in contact with the surface of the record 20, the adhesive 10 flowing out through the opening 19 is made even by the bottom face of the applicator member 18, thus uniformly applied to the surface of the record 20. Further, because the applicator member 18 is made of a soft and flexible material, it functions the same as the soft and flexible cylinder of the roller 15, permitting a uniform application of the adhesive to the surface of any warped or deformed record 20. In addition, since the applicator member 18 is removably installed to the slit 5, the layer adhesive 10 remaining on the bottom face of the applicator member 18 is cured and the applicator member can be easily replaced with a new one.

FIGS. 14 and 15 show variations of the arm member 3; they are so devised as to permit a slight movement of the container body 1 only in the vertical direction when the record cleaning device according to the present invention is set over the record 20. This vertical movement of the container body 1 aims at uniform application of the adhesive also to the warped or deformed surface of the record 20 without making the above-mentioned roller 15 or the applicator member 18, namely, soft and flexible member, be in contact with the surface of the record 20. The arm member 3' shown in FIG. 14 consists of two pieces 31 and 33. One of the pieces 31 has a protrusion 32 provided on the free end thereof, while the other piece 33 has provided in one end thereof a recess 34 for reception of said protrusion 32. The protrusion 32 is fitted into the recess 34 and connected vertically pivotably to the piece 33 by means of a pin 35. Accordingly, if the shaft 41 or stud 51 of the turntable 40 or record support 50 is inserted into the hole 7 in the arm member 3' with a less clearance, the arm piece 31 and the container 1 connected to the piece 31 move vertically corresponding to the waving of the surface of the record 20, thus the bottom face of the slit 5 being kept always a certain distance from the surface of the record 20. In other words, the clearance 8 is constant so that the adhesive 10 can be uniformly applied to the surface of the record 20. The arm member shown in FIGS. 15 (a) thru (c) has a hole 7' which is tapered toward its medium point from both the top and bottom and has an elliptic shape longer in the arm longitudinal direction as viewed from the top and bottom; this arm member functions the same as that shown in FIG. 14.

In all the embodiments of the record cleaning device, having been described in the foregoing, according to the present invention, the slit 5 formed in the bottom 4 of the container body 1 may have a same opening width along the total length thereof. A slit 5 of 3 mm or so in opening width formed in the shape of parallelogram in the bottom 4 of the container 1 will not practically incur any variation in discharge rate of the adhesive 10 along the length of the slit 5. However, even if the slit 5 is formed parallel to the length thereof in the container bottom 4, it is preferable for uniform application of the adhesive 10 to the surface of the record 20. Therefore, the container 1 is so configured that the volume of the adhesive 10 in the container 1 is greater as the outer end 11 thereof is approached. In addition to this geometry of the container 1, provision of the slit 5 divergent toward the outer end 11 of the container 1 will add to the effect of preventing uneven application of the adhesive 10 to the record surface.

The length of the slit 5 in the bottom 4 of the container 1 having been described in the above may be set to either the radial length of the sound groove zone of a 30-cm LP (long-playing) record or that of an EP (extended-play) record, but in case of the slit 5 made corresponding to the 30-cm LP record, use of a partition piece 23 as shown in FIG. 16 permits to employ the record cleaning device of the present invention to both the 30-cm LP and EP records. More particularly, the inside of the container 1 is divided by means of the partition piece 23; the one of the two spaces thus defined which is nearer to the arm member 3 is used for reception of the adhesive 10. In this way, the device can be used with various record of sizes smaller than the 30-cm LP record.

Figure 17:
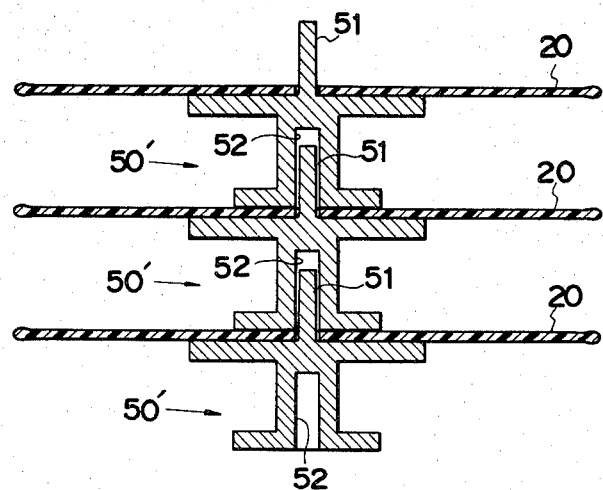
FIG. 17 is a sectional view of plural record mounts in use for drying records applied with the adhesive.
Figure 18:
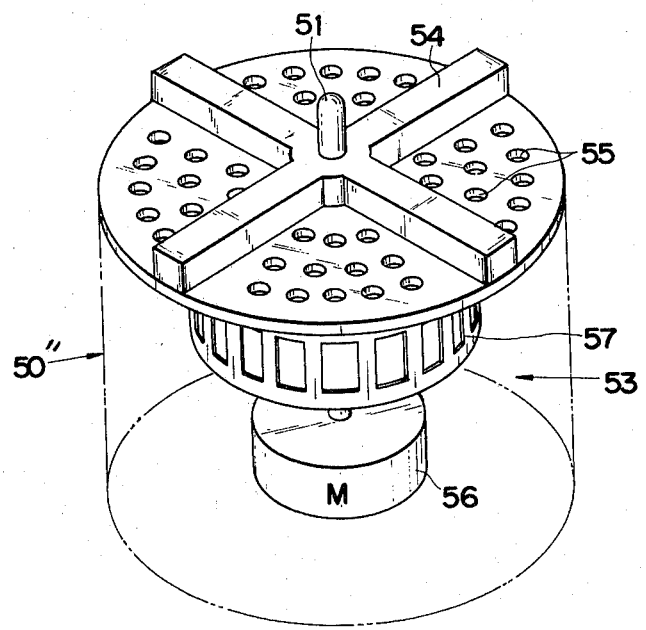
FIG. 18 shows perspectively a record mount provided with an air blower.

As a variation of the above-mentioned record support 50, the present invention provides a record support 50' shown in FIGS. 16 and 17. In this example in FIG. 16, the bottom thereof has provided therein a bore 52 in which the stud 51 is to be inserted; by inserting the stud 51 of the record support 50' into the bore 52 of another mount, a plurality of supports 50' can be stacked as shown in FIG. 17. By making a stack of plural supports 50' with a record 20 placed between the top face of a record mount and the bottom face of another mount, the adhesive 10 applied to the both sides of the plural records can be effectively dried. Of course, the top and bottom faces of this record support 50' are so dimensioned and shaped as not to be in contact with the zone, applied with the adhesive 10, of the record 20. A record support 50'' shown in FIG. 18 incorporates an air blower 53 to accelerate the drying of the adhesive 10 applied to the record surface. This record support 50'' has formed on the top thereof a record mount 54; the top of the record support 50'' has formed therein a plurality of vent holes 55; and the support 50'' houses an air blower with a ventilating fan 57 which is driven by a motor 56. Further, the vent holes 55 may be so formed in such a shape in the side face of the record support 50'' that the air can be blown in the upper oblique direction while the fan 57 is driven by the motor. By providing such holes 55 in both the top and bottom of the support 50'', the adhesive 10 applied to the records 20 on the supports 50'' stacked as shown in FIG. 17 each incorporating the air blower 53 can be effectively dried. Further, incorporation of a heater within the record support 50'' in addition to the air blower 53 will permit drying up the adhesive 10 on the record surface with a hot air.

The record cleaning device according to the present invention is operated as follows:

With the stud 6 or hole 7 at the free end of the arm member 3 positioned at the center hole 30 in the record 20, the container body 1 containing the adhesive 10 therein is turned about the stud 6 or hole 7; this simple operation permits an easy and uniform application of the adhesive 10 through the slit 5 in the container bottom 4 to the surface of the record 20. During this operation, the support member 9 provides a clearance 8 between the bottom of the slit 5 and the surface of the record 20, thus resulting in the application of the adhesive 10 to a layer of a thickness nearly equal to the size of clearance 8. Accordingly, the adhesive 10 is applied in an appropriate amount and to a proper thickness, thus producing a film 60 of the adhesive 10 on the record surface 20. The film thus produced is not so thin that it will be broken when peeled; and it is easily peeled off the record surface.

As having been described in the foregoing, the record cleaning device according to the present invention may be used not only with phonograph record but also with video discs. Particularly, the video disc must be kept free from deposition thereon of dirt and dust since they will spoil the sharpness or definition of a reproduced image. If the film 60 produced, after dried, from the adhesive 10 applied to the surface of phonograph record or video disc is left not peeled therefrom and the record or disc is stored with them covered by the adhesive film 60, dirt and dust can be kept off them until the next use.

The present invention may be embodied in many different variations and modifications without departure from the spirit of the present invention; and the scope of the present invention is determined only by the description in the claims.

What is claimed is:

1. A record cleaning deivce, comprising:
   a container body having a cavity for receiving therein an adhesive material to be applied onto a surface of a record for cleaning, said adhesive material being adapted to be peeled off the surface as a film after the material dries;
   an arm member attached to an end of the container body to be integrally formed therewith;
   positioning means provided at an end of said arm member, said positioning means being adapted to be located at the center of the record to be cleaned so that the container body can be rotated over the record;
   a slit formed in the bottom of said container body, the width of said slit increasing as the distance from the positioning means increases; and
   support means situated at at least one of the bottom face of the container body and the bottom face of the arm member to form a clearance between the bottom of the slit and an upper surface of the record to be cleaned when the cleaning device is located over the record, so that the adhesive material can be applied uniformly onto the upper surface of the record through the slit and the clearance when the container body is turned over the record.

2. A record cleaning device according to claim 1, in which the cross sectional area of the cavity in a plane normal to the plane of the record increases as the distance from the positioning means increases.

3. A recored cleaning device according to claim 1 in which said arm member is constructed so that the arm member can be folded at the middle portion thereof to permit vertical movement of the container body.

4. A record cleaning device according to claim 1, in which said positioning means is a hole adapted to receive a shaft of a player, said hole being tapered toward the middle portion thereof to permit pivotal movement of the container body in the vertical direction.

5. A record cleaning device, comprising:
- a container body having a cavity for receiving therein an adhesive material to be applied onto a surface of a record for cleaning, said adhesive material being adapted to be peeled off the surface as a film after the material dries;
- a slit formed in the bottom of said container body;
- a roller rotatably mounted in said slit, said roller being made of a soft and flexible material;
- an arm member attached to an end of the container body to be integrally formed therewith;
- positioning means provided at an end of said arm member, said positioning means being adapted to be located at the center of the record to be cleaned so that the container body can be rotated over the record; and
- support means situated at at least one of the bottom face of the container body and the bottom face of the arm member to form a clearance between the bottom of the slit and an upper surface of the record to be cleaned when the cleaning device is located over the record, so that the adhesive material can be applied uniformly onto the upper surface of the record through the slit and the clearance when the container body is turned over the record.

6. A record cleaning device according to claim 5, in which the cross sectional area of the cavity in a plane normal to the plane of the record increases as the distance from the positioning means increases.

7. A record cleaning device according to claim 5, in which said arm member is constructed so that the arm member can be folded at the middle portion thereof to permit vertical movement of the container body.

8. A record cleaning device according to claim 5, in which said positioning means is a hole adapted to receive a shaft of a player, said hole being tapered toward the middle portion thereof to permit pivotal movement of the container body in the vertical direction.

9. A record cleaning device, comprising:
- a container body having a cavity for receiving therein an adhesive material to be applied onto a surface of a record for cleaning, said adhesive material being adapted to be peeled off the surface as a film after the material dries;
- a slit formed in the bottom of said container body;
- an applicator removably attached to said slit and having an opening therein, said applicator being made of a soft and flexible material;
- an arm member attached to an end of the container body to be integrally formed therewith;
- positioning means provided at an end of said arm member, said positioning means being adapted to be located at the center of the record to be cleaned so that the container body can be rotated over the record; and
- support means situated at at least one of the bottom face of the container body and the bottom face of the arm member to form a clearance between the bottom of the slit and an upper surface of the record to be cleaned when the cleaning device is located over the record, so that the adhesive material can be applied uniformly onto the upper surface of the record through the slit and the clearance when the container body is turned over the record.

10. A record cleaning device according to claim 9, in which the cross sectional area of the cavity in a plane normal to the plane of the record increases as the distance from the positioning means increases.

11. A record cleaning device according to claim 9, in which said arm member is constructed so that the arm member can be folded at the middle portion thereof to permit vertical movement of the container body.

12. A record cleaning device according to claim 9, in which said positioning means is a hole adapted to receive a shaft of a player, said hole being tapered toward the middle portion thereof to permit pivotal movement of the container body in the vertical direction.

13. A record cleaning device, comprising:
- a container body having a cavity for receiving therein an adhesive material to be applied onto a surface of a record for cleaning, said adhesive material being adapted to be peeled off the surface as a film after the material dries;
- a slit formed in the bottom of said container body;
- an arm member attached to an end of the container body to be integrally formed therewith;
- positioning means provided at an end of said arm member, said positioning means being adapted to be located at the center of the record to be cleaned so that the container body can be rotated over the record;
- support means situated at at least one of the bottom face of the container body and the bottom face of the arm member to form a clearance between the bottom of the slit and an upper surface of the record to be cleaned when the cleaning device is located over the record, so that the adhesive material can be applied uniformly onto the upper surface of the record through the slit and the clearance when the container body is turned over the record; and
- a record support including a supporting body, a stud situated in the center of a top surface of the supporting body to project upwardly therefrom, and a bore located in the bottom of the supporting body, the record to be cleaned to be located on said supporting body to allow said stud to pass therethrough, so that the bore of another record support can be situated on the stud of the first mentioned record support with the record thereon for supporting another record thereon.

14. A record cleaning device according to claim 13, in which said record support further includes therein an air blower to blow air onto the record placed on said supporting body.

15. A record cleaning device according to claim 13, in which the cross sectional area of the cavity in a plane normal to the plane of the record increases as the distance from the positioning means increases.

16. A record cleaning device according to claim 13, in which said arm member is constructed so that the arm member can be folded at the middle portion thereof to permit vertical movement of the container body.

17. A record cleaning device according to claim 13, in which said positioning means is a hole adapted to receive a shaft of a player, said hole being tapered toward the middle portion thereof to permit pivotal movement of the container body in the vertical direction.

* * * * *